United States Patent
Bogner et al.

(10) Patent No.: US 11,603,860 B2
(45) Date of Patent: Mar. 14, 2023

(54) RADIAL COMPRESSOR HAVING IRIS DIAPHRAGM MECHANISM

(71) Applicant: Vitesco Technologies GMBH, Hannover (DE)

(72) Inventors: Mathis Bogner, Straubing (DE); Christoph Schäfer, Coburg (DE); Sasa Slavic, Heidelberg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 86 days.

(21) Appl. No.: 17/087,366

(22) Filed: Nov. 2, 2020

(65) Prior Publication Data
US 2021/0048038 A1 Feb. 18, 2021

Related U.S. Application Data

(63) Continuation of application No. PCT/EP2019/060482, filed on Apr. 24, 2019.

(30) Foreign Application Priority Data

May 3, 2018 (DE) ...................... 10 2018 206 841.0

(51) Int. Cl.
*F04D 29/46* (2006.01)
*F04D 29/056* (2006.01)
*F16K 3/03* (2006.01)

(52) U.S. Cl.
CPC ......... *F04D 29/464* (2013.01); *F04D 29/056* (2013.01); *F16K 3/03* (2013.01)

(58) Field of Classification Search
CPC ........ F04D 29/464; F04D 29/056; F16K 3/03; F05D 2220/40; F05D 2250/51
See application file for complete search history.

(56) References Cited

U.S. PATENT DOCUMENTS 2,037,663 A * 4/1936 Lalor ........................ F16K 3/03
138/45
2,515,948 A * 7/1950 Cyr ........................... F16K 3/03
138/45

(Continued)

FOREIGN PATENT DOCUMENTS

| CN | 102301106 A | 12/2011 |
| CN | 102840159 A | 12/2012 |

(Continued)

OTHER PUBLICATIONS

DE_60201201_T2_I English Machine Translation specification and Claims, (Year: 2005).*

(Continued)

*Primary Examiner* — David E Sosnowski
*Assistant Examiner* — Wayne A Lambert

(57) ABSTRACT

A radial compressor having a specially designed iris diaphragm mechanism is described. This mechanism includes only a single (main) blade that is driven directly by an actuating element, while the other blades are driven by the respective preceding blade via the movement of the main blade. This results in a particularly simple embodiment of the iris diaphragm mechanism. A blade for an iris diaphragm mechanism of this type and a charging device having a radial compressor of this type are furthermore described.

14 Claims, 2 Drawing Sheets

(56) References Cited

U.S. PATENT DOCUMENTS

| | | | |
|---|---|---|---|
| 2,649,272 A * | 8/1953 | Barbato | F16K 3/03 138/45 |
| 3,101,736 A * | 8/1963 | Egger | F16K 3/03 251/212 |
| 4,094,492 A * | 6/1978 | Beeman | F16K 3/03 138/45 |
| 4,122,668 A * | 10/1978 | Chou | F01D 21/006 188/290 |
| 5,806,725 A * | 9/1998 | Bennett | B65D 90/585 222/557 |
| 6,666,237 B2 * | 12/2003 | De Antoni Migliorati | B65B 39/005 141/286 |
| 6,896,240 B2 * | 5/2005 | Wijaya | F02D 9/18 251/212 |
| 7,290,947 B2 * | 11/2007 | Naganuma | G03B 9/22 396/453 |
| 7,819,728 B2 * | 10/2010 | Beckley | B60N 3/106 220/822 |
| 7,907,321 B2 * | 3/2011 | Mizumaki | G02B 5/005 359/227 |
| 8,196,610 B2 * | 6/2012 | Murakami | H05K 7/20272 138/45 |
| 8,215,613 B2 * | 7/2012 | Cheung | F02D 9/14 251/212 |
| 8,316,820 B1 * | 11/2012 | Cammarata | F02D 9/12 251/304 |
| 9,217,389 B1 * | 12/2015 | Lee | F02K 9/58 |
| 9,764,908 B2 * | 9/2017 | Lin | B65G 53/40 |
| 10,299,642 B2 * | 5/2019 | Buchanan | F04D 27/003 |
| 10,393,009 B2 | 8/2019 | Lombard et al. | |
| 2006/0261303 A1 * | 11/2006 | Thomas | F16K 3/03 251/212 |
| 2009/0095350 A1 | 4/2009 | Bauman et al. | |
| 2012/0023938 A1 | 2/2012 | Takashi et al. | |
| 2017/0211707 A1 * | 7/2017 | Wakayama | F02D 9/14 |
| 2017/0298943 A1 * | 10/2017 | Mohtar | F04D 29/464 |
| 2017/0298953 A1 * | 10/2017 | Lombard | F04D 29/462 |
| 2017/0320470 A1 | 11/2017 | Belanger et al. | |

FOREIGN PATENT DOCUMENTS

| | | | | |
|---|---|---|---|---|
| CN | 107304709 A | | 10/2017 | |
| DE | 2506030 A | * | 8/1975 | F16K 3/03 |
| DE | 60201201 | | 11/2005 | |
| EP | 2549266 A2 | | 1/2013 | |
| EP | 3236077 A1 | | 10/2017 | |
| GB | 924377 A | * | 4/1963 | |
| JP | 2009236035 A | | 10/2009 | |
| KR | 1173307 B1 | * | 8/2012 | F16K 27/04 |
| WO | WO-2016041024 A2 | * | 3/2016 | F04C 29/124 |
| WO | 2019052731 A1 | | 3/2019 | |
| WO | WO-2020031507 A1 | * | 2/2020 | F02B 33/40 |

OTHER PUBLICATIONS

Chinese Office Action dated Oct. 28, 2021 for corresponding Patent Application No. 201980030036.5.
German Patent Office Action dated Mar. 3, 2019 for counterpart DE patent applicatino 10 2018 206 841.0.
International Search Report and Written Opinion, dated Jul. 2, 2019 for counterpart PCT application PCT/EP2019/060482.

* cited by examiner

RADIAL COMPRESSOR HAVING IRIS DIAPHRAGM MECHANISM

CROSS REFERENCE TO RELATED APPLICATIONS

This application claims the benefit of PCT Application PCT/EP2019/060482, filed Apr. 24, 2019, which claims priority to German Application DE 10 2018 206 841.0, filed May 3, 2018. The disclosures of the above applications are incorporated herein by reference.

FIELD OF INVENTION

The present invention relates to a radial compressor for a charging device of an internal combustion engine, having a compressor arranged in a compressor housing, a fresh air feed duct for guiding a fresh air mass flow to the compressor wheel, and an iris diaphragm mechanism, which is arranged upstream of the compressor wheel in the fresh air feed duct and has a multiplicity of blades for opening and closing an iris orifice in order to variably set a flow cross section for the fresh air mass flow.

BACKGROUND

A radial compressor of this type has already been proposed in German Patent Application 10 2017 216 327, filed Sep. 14, 2017, which is not a prior publication. This radial compressor is configured such that the iris diaphragm mechanism has a plurality of blades, wherein each blade has at least one first and one second blade section and wherein an offset toward a direction perpendicular to a principal plane of extent of the blade is formed at least between the first blade section and the second blade section of the respective blade.

SUMMARY

The present invention relates to a novel concept for moving the individual blades for opening and closing the corresponding diaphragm orifice. In the prior art, there is a known practice of moving the blades to open and close the diaphragm orifice with the aid of an actuating device, which has an actuating lever and an adjusting ring having two fingers. The actuating lever is arranged between the adjusting ring having the two fingers. When the lever rotates, the adjusting ring is rotated. Slots which guide each blade of the iris diaphragm mechanism are arranged on the underside of the adjusting ring. Here, the number of slots corresponds to the number of blades. Each blade has two journals, wherein one is fixed in the compressor housing and the other is guided in a slot of the adjusting ring. In order to rotate a blade, the actuating element must therefore rotate the adjusting ring, which rotates all the blades to open or close the diaphragm orifice.

The present invention is based on providing a radial compressor of the type described above, in which the iris diaphragm mechanism has a particularly simple construction.

This is achieved in accordance with an example embodiment in a radial compressor of the specified type by virtue of the fact that the multiplicity of the blades has a main blade, which is actuated for adjustment by an actuating element, and blades guided for adjustment by the main blade; all the blades are rotatably mounted on the compressor housing or on some other fixed component; and all the blades have a guide slot, in which a guide element of the respectively adjacent blade engages for adjustment of the following blade.

The example embodiment is thus directed to an iris diaphragm mechanism which has self-guiding blades. Therefore, an actuating element no longer engages all the blades (via an adjusting ring) but now directly engages only a main blade, while the other blades are driven or moved by this main blade to open or close the diaphragm orifice. This results in a number of advantages.

The kinematics are very simple since the actuating element provided directly drives just one single blade. There is no need to provide an additional axial and radial bearing. Only a minimal number of moving parts is required, and only those parts which have to be moved do move. Only a small space is required in the axial direction.

Moreover, only a simple seal is required.

The mechanism may be operated via a linearly or rotationally acting actuating element. For this purpose, only a low driving force is required.

Overall, a simple design, simple assembly and a low cost outlay are obtained.

In the solution according to the invention, the actuating element provided engages just a single blade, namely the main blade. This transmits the movement to the next guided blade, which is rotatably mounted in an appropriate manner but is not directly connected to the actuating element. The first guided blade then transmits its movement to the second guided blade etc., until the circle is completed and the last guided blade acts on the main blade again. All the blades are provided with a guide slot, in which a guide element of the respectively adjacent blade engages for adjustment of the following blade. In this arrangement, the guide element is moved in the guide slot as far as the end thereof (stop) and thus brings about the movement of the following blade, etc.

During the movement in one direction, the diaphragm orifice is in this way increasingly closed, whereas, in the case of a movement in the opposite direction, it is increasingly opened.

In an example embodiment, the main blade has a main aperture, with which an actuating pin that acts linearly or in a rotary manner interacts as an actuating element. By means of such a linear or rotational movement of the actuating pin, the opening or closing of the iris diaphragm mechanism is initiated, wherein, as explained above, the main blade transmits its movement to the guided blades for opening or closing.

As regards the coupling of the blades to one another, this is achieved by means of a guide element that engages in a guide slot of the following blade. This guide element is implemented as a journal that engages in the guide slot of the following blade and is movable therein.

Moreover, all the blades have a bearing journal rotatably mounted on the compressor housing or on some other fixed component. For opening or closing, therefore, the blades essentially perform a pivoting movement about the respective bearing journal.

The example embodiment is distinguished by a particularly simple design. Thus, apart from the main aperture, the guided blades are of identical design to the main blade.

All the blades have approximately the shape of a semicircular ring. More specifically, the guide element and the bearing journal of a blade are arranged in the end regions of the blade, wherein the guide slot is arranged in the blade section adjacent to the bearing journal. This means that the blades are pivotably mounted in an end region, while they transmit the movement to the respective following blade by means of the guide element arranged in the other end region, wherein this guide element in turn engages in the guide slot arranged in the adjacent blade.

The example embodiment furthermore relates to a blade for an iris diaphragm mechanism of a radial compressor of the type described above. The blade has approximately the shape of a semicircular ring and has a guide slot, a guide element and a bearing element. This construction corresponds to the guided blades described above, while the main blade additionally has a device which establishes a connection to the provided actuating element of the iris diaphragm mechanism. This device may be a main aperture, in which a linearly or rotationally acting actuating pin engages.

The guide element and the bearing element of the blades are arranged in the end regions of the blades. In this arrangement, the guide slot is in the blade section adjacent to the bearing journal.

The present invention furthermore relates to a charging device for an internal combustion engine which is provided with a radial compressor of the type described above. In this context, the charging device may be designed as an exhaust-gas turbocharger or as an electric-motor-operated supercharger or as a supercharger operated via a mechanical coupling to the internal combustion engine, for example.

The iris diaphragm mechanism described here may have a multiplicity of blades, which may be a main blade and at least two guided blades.

BRIEF DESCRIPTION OF THE DRAWINGS

The invention will be explained in detail hereunder by means of an example embodiment in conjunction with the drawings. In the drawings.

DETAILED DESCRIPTION

In conjunction with the illustrative embodiment explained below, only the design of the iris diaphragm mechanism with the individual blades is described in detail. There is no further explanation here of the overall design of the radial compressor. This may be designed in the manner explained in the earlier German Patent Application cited above, for example.

Figure 1:
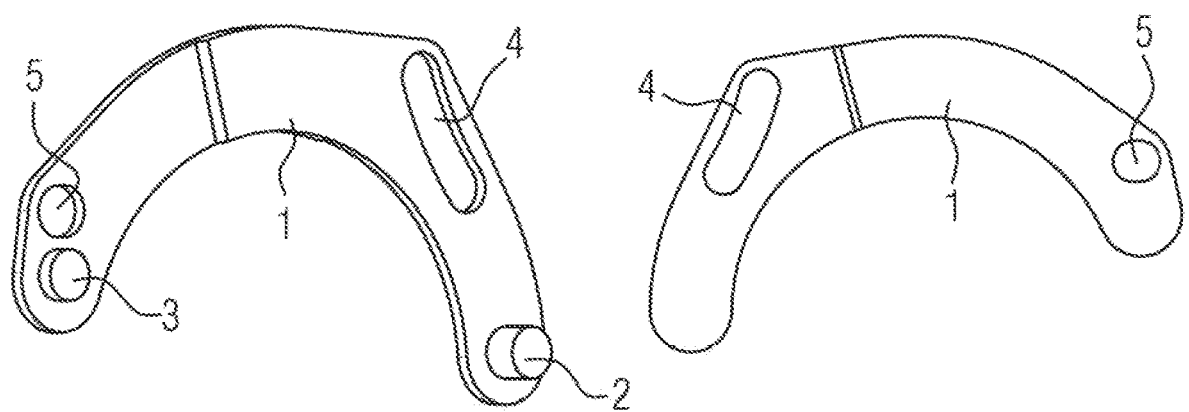
FIG. 1 shows a front view and a rear view of a main blade of an iris diaphragm mechanism.
Figure 2:
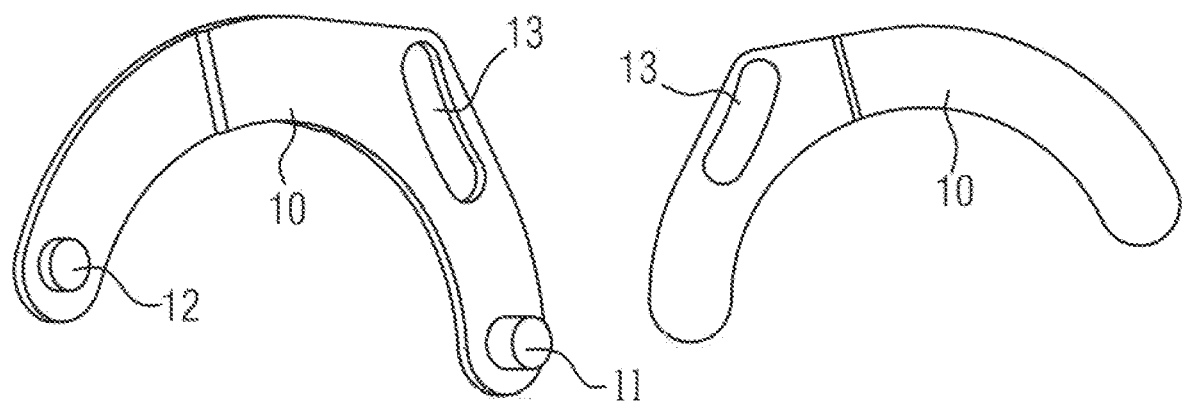
FIG. 2 shows a front view and a rear view of a guided blade of an iris diaphragm mechanism.
Figure 3:
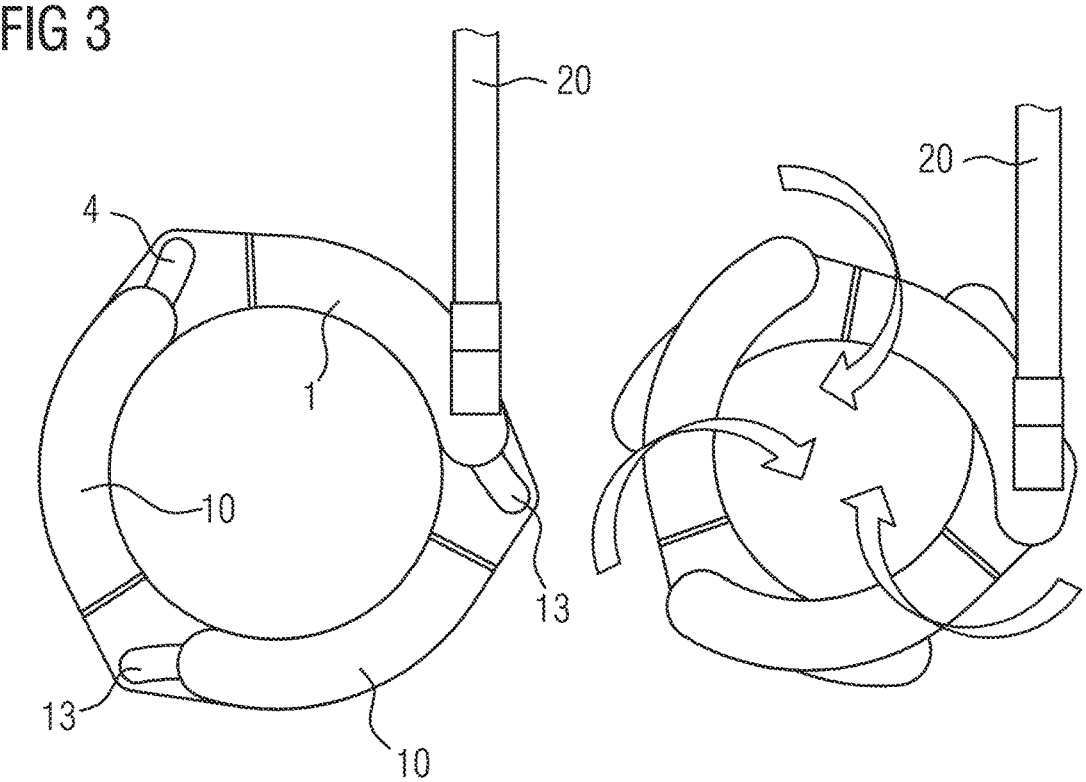
FIG. 3 shows a schematic view of the blades of an iris diaphragm mechanism in a state placed one against the other, with an actuating element, wherein two different positions are illustrated.
Figure 4:
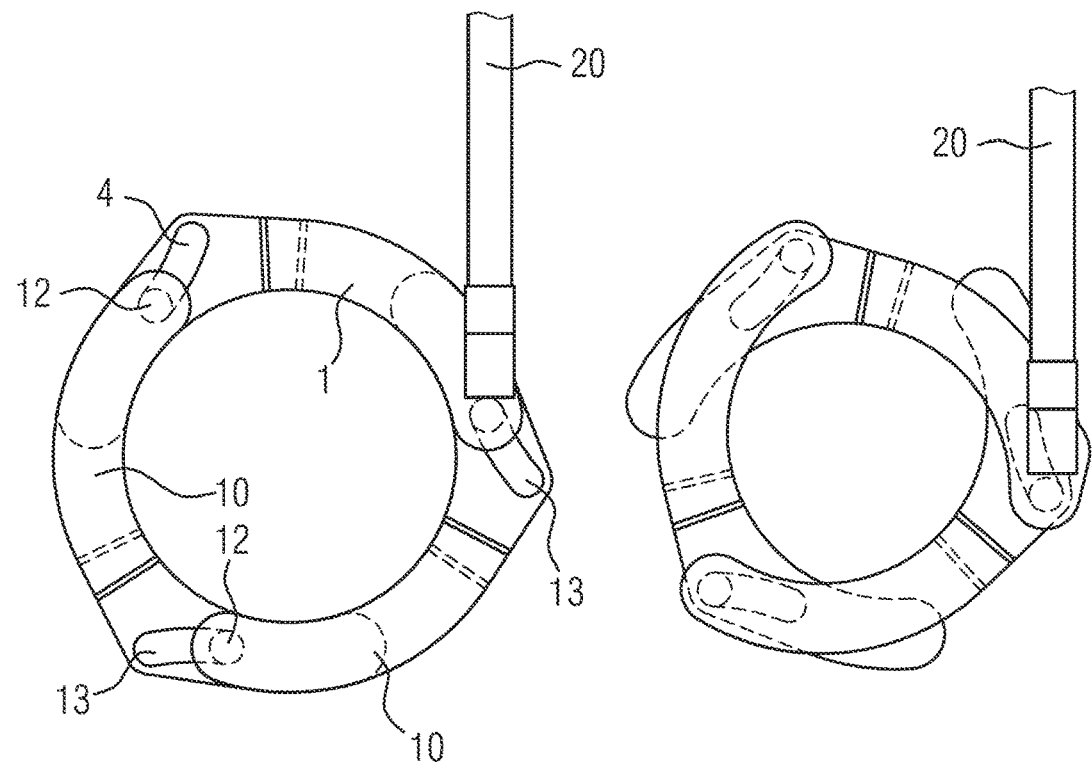
FIG. 4 shows a view like that in FIG. 3, illustrating the guide journal engaging in the guide slots.

Arranged upstream of the compressor wheel of the radial compressor, in the fresh air feed duct, is an iris diaphragm mechanism, which is illustrated schematically in the view in FIGS. 3 and 4 and includes a multiplicity of blades, which are illustrated schematically in FIGS. 1 and 2. In the illustrative embodiment illustrated here, a main blade 1 interacts with two guided blades 10. In the left-hand view in FIG. 1, the main blade 1 is illustrated in a rear view, and, in the right-hand view in FIG. 1, it is illustrated in a front view. In FIG. 2, a guided blade is shown on the left in rear view and on the right in front view.

In total, therefore, the iris diaphragm mechanism has three blades. It is actuated by means of a linearly acting actuating pin 20 of an actuating mechanism (not illustrated) in order to at least partially open or close the corresponding diaphragm orifice of the mechanism. In FIG. 3, an open position of the mechanism is illustrated on the left and a partially closed position thereof is illustrated on the right.

The actuating pin 20 engages in a main aperture 5 of the main blade 1 shown in FIG. 1 and, in a linear movement, brings about a pivoting of the main blade 1 about a bearing journal 2. Owing to this pivoting movement, a guide journal 3 of the main blade 1 moves in a guide slot 13 of the following blade 10 as far as the edge of the guide slot 13 and in this way pivots the following blade, which in turn engages by means of a guide journal 12 in a guide slot 4, 13 of another following blade 10 and pivots this too. Finally, the guide journal 12 of the second following blade takes effect during this process.

This blade is rotatably or pivotably mounted on the compressor housing via a bearing journal 2 or 11. It can therefore be stated in summary that, in the solution described here, only the main blade 1 is driven directly by means of the actuating element 20, while the other blades are merely moved by the movement of the preceding blade. This concept therefore represents a departure from the known concept of a movement of the iris diaphragm mechanism by means of an adjusting ring that is directly connected to each blade and engages thereon.

The invention claimed is:

1. A radial compressor for a charging device of an internal combustion engine, the radial compressor comprising:
a compressor arranged in a compressor housing,
a fresh air feed duct for guiding a fresh air mass flow to a compressor wheel of the radial compressor, and
an iris diaphragm mechanism arranged upstream of the compressor wheel in the fresh air feed duct and having a multiplicity of blades for opening and closing an iris orifice to variably set a flow cross section for the fresh air mass flow,
the multiplicity of the blades includes:
a main blade actuated for adjustment by an actuating element, and
blades guided for adjustment by the main blade,
wherein all the blades include a bearing element, a guide element, and a guide slot, each of the blades is rotatably mounted on the compressor housing via the bearing element,
the guide element of a respectively adjacent blade engages with the guide slot for adjustment of a following blade, wherein the guide element and the bearing element of a blade are arranged in end regions of the blade and the guide slot is arranged between the bearing element and the guide element.

2. The radial compressor as claimed in claim 1, wherein the main blade has a main aperture, with which an actuating pin that acts linearly interacts as the actuating element.

3. The radial compressor as claimed in claim 1, wherein the guide element is a journal that engages in the guide slot of the following blade and is movable therein.

4. The radial compressor as claimed in claim 1, wherein apart from the main aperture, the guided blades are of identical design to the main blade.

5. The radial compressor as claimed in claim 1, wherein all the blades have a shape of a semicircular ring.

6. A blade for an iris diaphragm mechanism of a radial compressor as claimed in claim 1, wherein the blade has a shape of a semicircular ring.

7. A charging device for an internal combustion engine having a radial compressor as claimed in claim 1.

8. An iris diaphragm mechanism for a radial compressor, the iris diaphragm comprising:
- a plurality of blades operatively coupled to each other for opening and closing an iris orifice in order to variably set a flow cross section for a fresh air mass flow in the radial compressor, the plurality of the blades comprising a main blade which is actuated for adjustment by an actuating element, and guided blades guided for adjustment by the main blade, each blade of the plurality of blades includes a bearing element, a guide element, and a guide slot,
- wherein the plurality of blades are configured for rotatable mounting on a radial compressor housing via the bearing element, and the guide element of an adjacent blade engages with the guide slot for adjustment of a following blade, wherein the guide element and the bearing element of a blade are arranged in end regions of the blade and the guide slot is arranged between the bearing element and the guide element.

9. The iris diaphragm of claim 8, wherein the main blade has a main aperture for engaging with an actuating pin that acts linearly as the actuating element of the iris diaphragm.

10. The iris diaphragm of claim 9, wherein except for the main aperture, the guided blades are identical to the main blade.

11. The iris diaphragm of claim 8, wherein the guide element of each of the plurality of blades is a journal that engages in the guide slot of a following blade and is movable therein.

12. The iris diaphragm of claim 8, wherein each blade of the plurality of blades has a bearing journal for the rotatable mounting on the compressor housing.

13. The iris diaphragm of claim 12, wherein for each blade of the plurality of blades, the guide slot is arranged in the blade adjacent to the bearing journal.

14. The iris diaphragm of claim 8, wherein each blade of the plurality of blades has a partial annular shape.

* * * * *